(12) United States Patent
Gornall et al.

(10) Patent No.: US 10,562,608 B1
(45) Date of Patent: Feb. 18, 2020

(54) VARIABLE PITCH MECHANISMS FOR PROPELLER BLADES USING LINEAR ACTUATION

(71) Applicant: Amazon Technologies, Inc., Seattle, WA (US)

(72) Inventors: Christopher Gornall, Essex (GB); David Moro Ludena, Madrid (ES); Cyriel Notteboom, Cambridge (GB); James Thomas, Cambridgeshire (GB)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 15/605,572

(22) Filed: May 25, 2017

(51) Int. Cl.
*B64C 11/32* (2006.01)

(52) U.S. Cl.
CPC .................... *B64C 11/32* (2013.01)

(58) Field of Classification Search
CPC .......... F01D 7/00; F01D 7/02; F05D 2260/74; F05D 2260/79; F05D 2260/75; F05D 2260/70; F05D 2270/66; B64C 11/32; B64C 11/30; B64C 11/06; B64C 11/36; B64C 2201/024; B64C 2201/00; B64C 2201/042; B64C 27/04; B64C 27/06; B64C 27/327; B64C 29/0033; F04D 29/323; F04D 29/36; F16C 2326/43
See application file for complete search history.

(56) References Cited

U.S. PATENT DOCUMENTS

| | | | | | |
|---|---|---|---|---|---|
| 1,556,012 A | * | 10/1925 | Flettner | .................... | B63H 1/28 416/164 |
| 1,994,143 A | * | 3/1935 | Martens | .................. | B64C 11/36 416/163 |
| 2,117,788 A | * | 5/1938 | Cable | .................... | B64C 11/343 416/89 |
| 2,495,434 A | * | 1/1950 | Troller | .................... | B64C 11/30 415/129 |
| 2,501,227 A | * | 3/1950 | Lewis | .................... | B64C 13/30 123/41.64 |
| 2,566,696 A | * | 9/1951 | Cushman | ................ | B64C 11/06 416/139 |
| 2,625,999 A | * | 1/1953 | Voyce | .................... | B64C 11/36 416/153 |
| 2,666,149 A | * | 1/1954 | Fumagalli | ............. | F03D 7/0224 290/44 |
| 2,720,272 A | * | 10/1955 | Prince | .................... | B64C 29/02 416/114 |

(Continued)

*Primary Examiner* — Justin D Seabe
*Assistant Examiner* — Joshua R Beebe
(74) *Attorney, Agent, or Firm* — Athorus, PLLC

(57) ABSTRACT

Various mechanisms for adjusting pitches of propeller blades are described. For example, the pitch adjustment mechanism may include a propeller hub enclosing a geared mechanism that cooperates with a compound gearbox having first and second planetary stages to adjust pitches of propeller blades. Alternatively, the pitch adjustment mechanism may include a propeller hub enclosing a pitch adjustment assembly that utilizes tension cables and torsion springs, or rack-and-pinion structures, to adjust pitches of propeller blades. Using any of the various mechanisms, the pitches of propeller blades may be rotated at least 90 degrees, and up to and exceeding 360 degrees, in order to effect thrust reversals and/or adjust thrust profiles.

18 Claims, 9 Drawing Sheets

(56) References Cited

U.S. PATENT DOCUMENTS

| | | | | |
|---|---|---|---|---|
| 3,128,829 | A | * | 4/1964 | Young .................. B64C 11/003 416/88 |
| 3,578,877 | A | * | 5/1971 | Mautz .................. B64C 27/327 416/114 |
| 4,534,524 | A | * | 8/1985 | Aldrich .................. B64C 27/58 244/17.25 |
| 2014/0248168 | A1 | * | 9/2014 | Chantriaux ............. B64C 27/14 417/410.1 |

* cited by examiner

VARIABLE PITCH MECHANISMS FOR PROPELLER BLADES USING LINEAR ACTUATION

BACKGROUND

Aerial vehicles, including autonomous or automated aerial vehicles, may utilize propellers and corresponding motors to generate lift and/or thrust. It may be desirable to vary pitches of one or more of the propeller blades to alter a thrust profile or otherwise affect lift or maneuverability of the aerial vehicles. However, existing mechanisms for varying pitches of propeller blades suffer from limited range of motion, e.g., less than a 90 degree change of blade pitch. Accordingly, there is a need for propeller blade pitch adjustment mechanisms that can provide a greater range of motion, e.g., greater than a 90 degree change of blade pitch.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
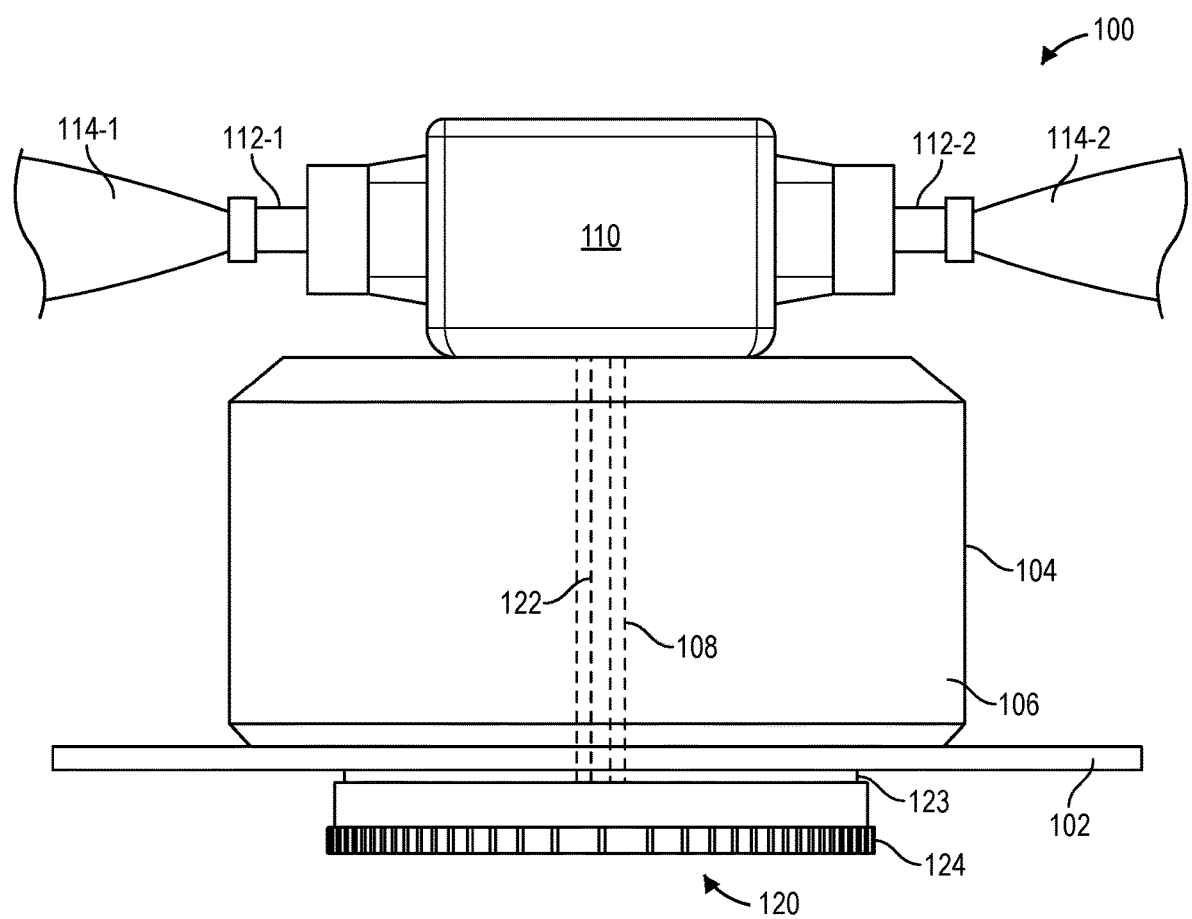
FIG. 1 is a schematic diagram of a first propeller blade pitch adjustment apparatus, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various propeller blade pitch adjustment apparatuses are described herein. Each of the example embodiments of pitch adjustment apparatuses allows a variation in pitch of a propeller blade of at least more than 90 degrees and/or up to and exceeding 360 degrees, and some embodiments allow potentially infinite variation in pitch of a propeller blade. In addition, for various embodiments described herein, the pitch of a propeller blade may be varied by actuation of a pitch adjustment shaft or a control shaft.

The pitch adjustment apparatuses as described herein may allow reversal of thrust, or inversion of a thrust profile, of a propeller and corresponding motor without any reduction in propulsive efficiency. For example, the pitches of blades of a propeller may be rotated approximately 180 degrees using any of the pitch adjustment apparatuses described herein, and the rotation of the motor may be reversed, thereby reversing the thrust, or inverting the thrust profile, of the propeller and corresponding motor without any reduction in propulsive efficiency.

Such reversal of thrust may be useful for aerial vehicles in order to slow down, stop, or move in a reverse direction, e.g., when the aerial vehicles are on the ground. In addition, reversal of thrust may be useful for aerial vehicles to maintain stable flight in various operating conditions, e.g., in the case of one or more motor failures, or when operating in extreme environments, such as windy environments. Further, reversal of thrust may be useful for aerial vehicles that utilize one or more propellers and corresponding motors for both vertical takeoff and landing (VTOL) and also horizontal flight, e.g., for aerial vehicles having propellers and corresponding motors that tilt between vertical and horizontal flight configurations. Many other applications of thrust reversal, or other desired changes in thrust profiles, using the pitch adjustment apparatuses described herein are possible. Moreover, although the present disclosure describes pitch adjustment apparatuses in the context of aerial vehicles, the pitch adjustment apparatuses described herein may be used in any other vehicles, machines, devices, or other systems that utilize propellers, fans, or other similar structures having blades, and that are rotated by motors or other propulsion sources.

In some embodiments, the pitch adjustment apparatus may include a propeller hub and a compound gearbox. The propeller hub may be coupled to and rotated by a first end of a motor shaft that is rotated by a rotor of a motor, and the motor shaft may be a hollow motor shaft. The propeller hub may include one or more propeller blade shafts, and each of the propeller blade shafts may be connected to a propeller blade at a first end that extends out of the propeller hub and may be connected to a blade gear, e.g., a bevel gear, at a second end within the propeller hub.

A pitch adjustment shaft may extend within and through the hollow motor shaft, and a pitch adjustment gear, e.g., a bevel gear, may be connected to a first end of the pitch adjustment shaft within the propeller hub. The pitch adjustment gear may be in operative engagement with each of the blade gears associated with respective propeller blade shafts and propeller blades. Accordingly, rotation of the pitch adjustment shaft and pitch adjustment gear may cause corresponding rotations of each of the blade gears, propeller blade shafts, and propeller blades to adjust pitches of the propeller blades.

The second end of the motor shaft and the second end of the pitch adjustment shaft may each be coupled to components within a compound gearbox, e.g., gearbox. The gearbox may be configured to allow the motor shaft and the pitch adjustment shaft to rotate in a same direction at a same rotational speed such that during operation of the motor, the propeller blades may rotate to generate thrust based on the rotation of the motor shaft, while also maintaining a desired pitch of the propeller blades during operation.

The compound gearbox, e.g., gearbox, may include a first stage gearbox, e.g., a first planetary stage, and a second stage gearbox, e.g., a second planetary stage. The first stage gearbox may include a first sun gear, a plurality of first planet gears carried by a first planetary gear carrier, and a ring gear. The second end of the motor shaft may be connected to and rotate the first sun gear of the first stage gearbox. The plurality of first planet gears may be in operative engagement with the first sun gear and carried by the first planetary gear carrier. The first planetary gear carrier may be rotationally fixed, e.g., relative to a stator of the motor, or another component coupled to the stator. The ring gear may be in operative engagement with the plurality of first planet gears and rotate around the plurality of first planet gears and the first sun gear.

The second stage gearbox may include a second sun gear, a plurality of second planet gears carried by a second planetary gear carrier, and the ring gear. The plurality of second planet gears may be in operative engagement with the ring gear, and rotation of the ring gear may cause the plurality of second planet gears to rotate on the second planetary gear carrier. The second planetary gear carrier may be selectively rotatable relative to a fixed position of the first planetary gear carrier. The second sun gear may be in operative engagement with the plurality of second planet gears, and rotation of the plurality of second planet gears may cause the second sun gear to rotate. The second sun gear may be connected to and rotate the second end of the pitch adjustment shaft.

When the second planetary gear carrier is held in position relative to the first planetary gear carrier, the motor shaft and the pitch adjustment shaft may rotate in a same direction at a same rotational speed, and the propeller blades may maintain a constant pitch. In order to adjust the pitches of the propeller blades, the second planetary gear carrier may be rotated relative to the first planetary gear carrier. The rotation of the second planetary gear carrier may cause rotation of the second planet gears, the second sun gear, the pitch adjustment shaft, and the pitch adjustment gear, and thereby may cause rotation of the blade gears, propeller blade shafts, and propeller blades to adjust the pitches of the propeller blades.

In other embodiments, the pitch adjustment apparatus may include a propeller hub that is coupled to and rotated by a motor shaft, and a propeller blade pitch adjustment assembly within the propeller hub. The motor shaft may be hollow, and the propeller hub may enclose an interior space within which the propeller blade pitch adjustment assembly is at least partially movably situated.

The propeller blade pitch adjustment assembly may include one or more pitch adjustment spools that are each coupled to a propeller blade that extends outside the propeller hub. Each pitch adjustment spool may rotate and thereby cause the propeller blade to rotate and adjust its pitch. The one or more pitch adjustment spools may be operatively engaged with a control member that controls the rotation of the pitch adjustment spools. In addition, a control shaft may be rotatably coupled to the control member to adjust a position of the control member. The control shaft may extend through the hollow motor shaft.

In some embodiments, two or more pitch adjustment spools may be rotatably connected to each other via a torsion spring, and each pitch adjustment spool may be connected to the control member via a tension cable. The control member may be a plate, block, or other structure that moves within the propeller hub in a direction transverse to axes of rotation of the pitch adjustment spools and propeller blades. The control shaft may be rotatably connected to the control member via a bearing and also move within the propeller hub and the hollow motor shaft in a direction transverse to axes of rotation of the pitch adjustment spools and propeller blades. Movement of the control shaft and control member away from the pitch adjustment spools may pull the tension cables against a biasing force of the torsion spring and rotate the pitch adjustment spools, thereby adjusting pitches of the propeller blades.

In further embodiments, two or more pitch adjustment spools may be rotatably connected to each other, and each pitch adjustment spool may include a gear, e.g., a pinion gear, on an outer surface. The control member may include racks, e.g., including gear teeth, on inner surfaces that are operatively engaged with the gears of the pitch adjustment spools, and the control member may move within the propeller hub in a direction transverse to axes of rotation of the pitch adjustment spools and propeller blades. The control shaft may be rotatably connected to the control member via a bearing and also move within the propeller hub and the hollow motor shaft in a direction transverse to axes of rotation of the pitch adjustment spools and propeller blades. Movement of the control shaft and control member may rotate the pitch adjustment spools via the racks and pinion gears, thereby adjusting pitches of the propeller blades.

FIG. 1 is a schematic diagram of a first propeller blade pitch adjustment apparatus 100, according to an implementation. The apparatus 100 may include a propeller hub 110 and a compound gearbox 120 that are arranged on either side of a motor 104. The motor 104 may be supported on a motor arm 102 or other frame or body portion of an aerial vehicle. For example, the motor 104 may include a stator 106, and a rotor (not shown) that is coupled to and rotates a motor shaft 108. The motor shaft 108 may be a hollow motor shaft that extends from opposing sides of the motor 104. In addition, a pitch adjustment shaft 122 may extend within the hollow motor shaft 108 between components within each of the propeller hub 110 and the compound gearbox 120, as further described with respect to FIGS. 2-5.

Figure 2:
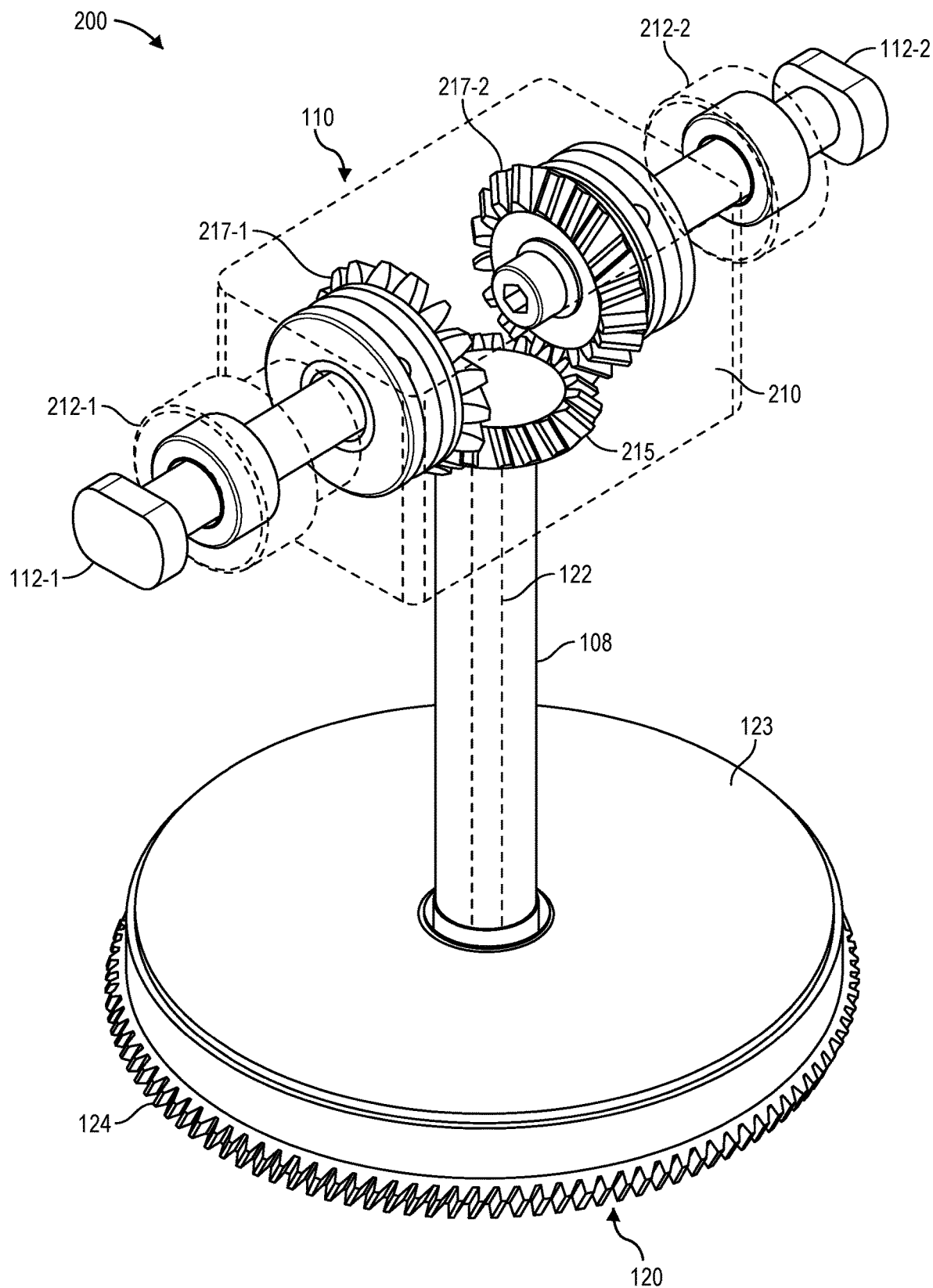
FIG. 2 is a schematic diagram of a propeller hub and a compound gearbox of the first propeller blade pitch adjustment apparatus, according to an implementation.

At a first end, the motor shaft 108 may be coupled to the propeller hub 110, as further described with respect to FIG. 2. Extending out from the propeller hub 110 may be propeller blade shafts 112 and corresponding propeller blades 114. Alternatively or in addition, the propeller blade shafts 112 and propeller blades 114 may be integrally formed with each other, or only the propeller blades 114 may extend from the propeller hub 110, with the propeller blade shafts 112 being substantially enclosed within the propeller hub 110. While FIG. 1 shows two propeller blade shafts 112-1, 112-2 and two corresponding propeller blades 114-1, 114-2, any other number and arrangement of propeller blade shafts 112 and propeller blades 114 may extend from the propeller hub 110.

When the motor shaft 108 is rotated by the rotor of the motor 104, the propeller hub 110 may rotate together with the motor shaft 108, such that the propeller blade shafts 112 and propeller blades 114 also rotate. Rotation of the propeller blades 114 may generate thrust, dependent on the shape and pitch of the propeller blades.

Figure 3:
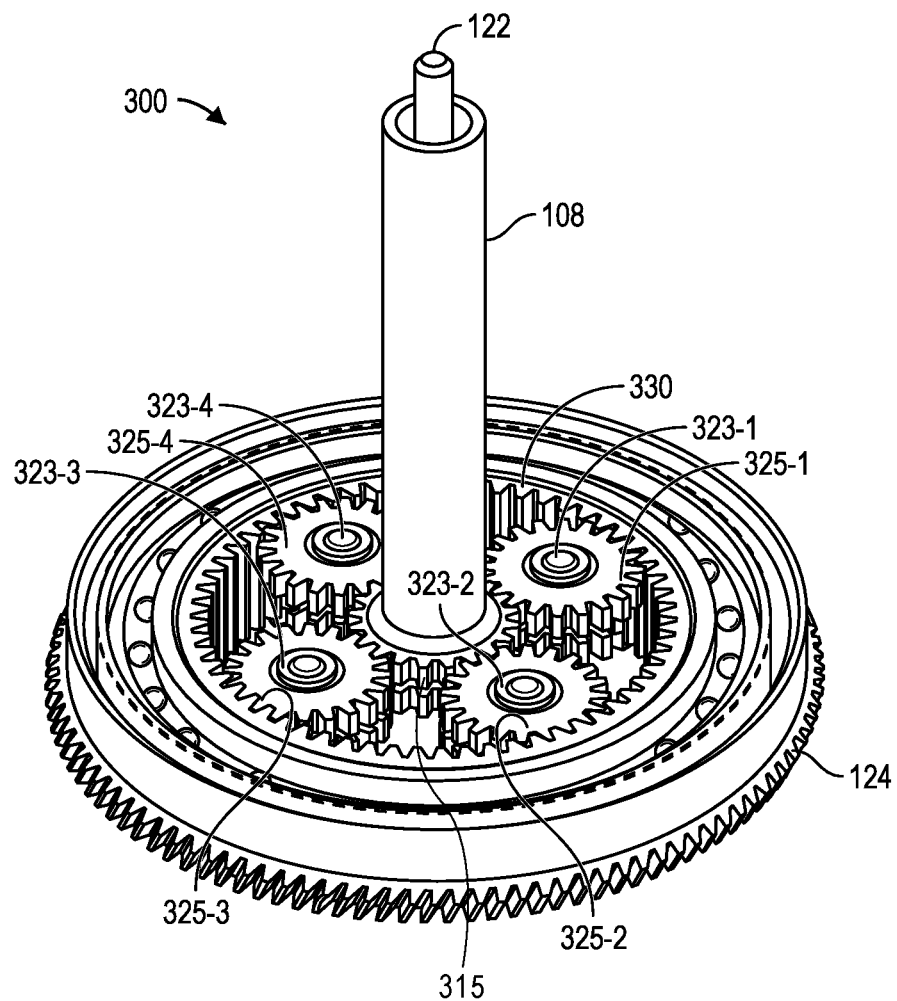
FIG. 3 is a schematic diagram of a first stage gearbox of the compound gearbox of the first propeller blade pitch adjustment apparatus, according to an implementation.
Figure 4:
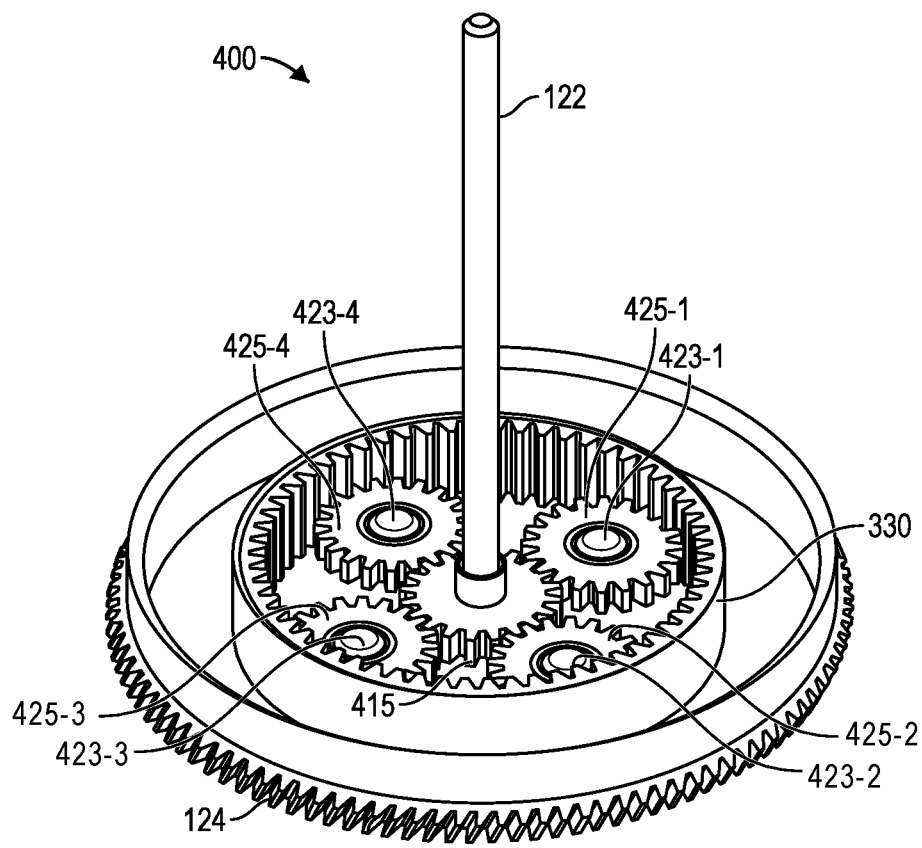
FIG. 4 is a schematic diagram of a second stage gearbox of the compound gearbox of the first propeller blade pitch adjustment apparatus, according to an implementation.
Figure 5:
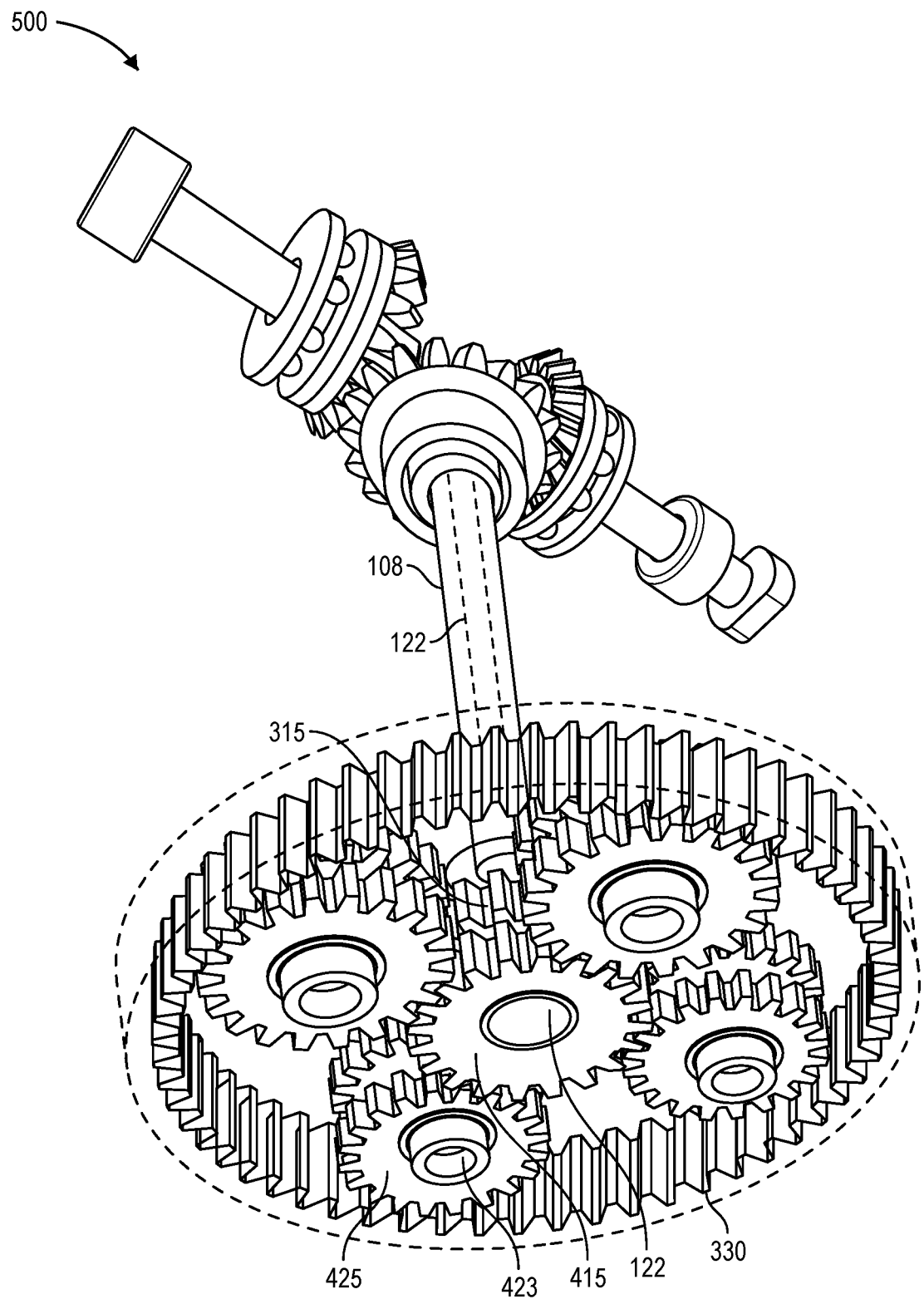
FIG. 5 is a schematic diagram of the compound gearbox of the first propeller blade pitch adjustment apparatus, according to an implementation.

At a second end, the motor shaft 108 may be coupled to a component within the compound gearbox 120, as further described with respect to FIGS. 3-5. As shown in FIG. 1, the compound gearbox 120 may include a first planetary gear carrier 123 and a second planetary gear carrier 124, each of which is further described with respect to FIGS. 3-5. The first planetary gear carrier 123 may be coupled or fixed to the motor arm 102 and/or the stator 106 of the motor 104. Accordingly, the first planetary gear carrier 123 may be rotationally fixed relative to the stator 106 of the motor 104. The second planetary gear carrier 124 may be rotatable relative to the first planetary gear carrier 123. For example, the second planetary gear carrier 124 may include gear teeth on an outer surface by which the second planetary gear carrier 124 may be selectively rotated, e.g., by an actuator.

FIG. 2 is a schematic diagram of a propeller hub 110 and a compound gearbox 120 of the first propeller blade pitch adjustment apparatus 200, according to an implementation. The apparatus 200 shown in FIG. 2 is substantially the same as the apparatus 100 shown in FIG. 1, but with some elements removed and/or shown in outline for clarity of description. The apparatus 200 may include a propeller hub 110 and a compound gearbox 120 that are arranged at opposite ends of a motor shaft 108. The motor shaft 108 may be rotated by a rotor of a motor and may be a hollow motor shaft.

As described herein, a second end of the motor shaft 108 may be coupled to a component within the compound gearbox 120, as further described with respect to FIGS. 3-5. The compound gearbox 120 may include a rotationally fixed first planetary gear carrier 123 and a selectively rotatable second planetary gear carrier 124, each of which is further described with respect to FIGS. 3-5. In addition, a pitch adjustment shaft 122 may extend within the hollow motor shaft 108, and a second end of the pitch adjustment shaft 122 may couple to a component within the compound gearbox 120, as further described with respect to FIGS. 3-5.

A first end of the motor shaft 108 may be coupled to the propeller hub 110. The propeller hub 110 may include a housing 210 that encloses an interior space and one or more openings 212 through which propeller blade shafts 112 or propeller blades 114 may extend out from the propeller hub 110. Portions of the propeller blade shafts 112, the propeller blades 114, and the openings 212 may be circular or cylindrical in order to allow rotation of the propeller blade shafts 112 or propeller blades 114 within the openings 212. In addition, each of the openings 212 may include one or more bearings or other similar, friction-reducing elements to facilitate rotation of the propeller blade shafts 112 or propeller blades 114. While FIG. 2 shows two openings 212-1, 212-2, any other number and arrangement of openings 212 may be provided in the propeller hub 110 to accommodate the propeller blade shafts 112 or propeller blades 114.

When the motor shaft 108 is rotated by the rotor of the motor, the propeller hub 110, including the housing 210 and the openings 212, may rotate together with the motor shaft 108, such that the propeller blade shafts 112 and propeller blades 114 also rotate with rotation of the motor shaft 108. Rotation of the propeller blades 114 may generate thrust, dependent on the shape and pitch of the propeller blades.

Within the housing 210 of the propeller hub 110, each of the propeller blade shafts 112 may couple to a blade gear 217. The blade gears 217 may be bevel gears, e.g., straight bevel gears or spiral bevel gears. In addition, each of the propeller blade shafts 112 and/or blade gears 217 may include one or more bearings or other similar, friction-reducing elements to facilitate rotation of the blade gears 217 relative to the housing 210. While FIG. 2 shows two blade gears 217-1, 217-2, any other number and arrangement of blade gears 217 associated with the propeller blade shafts 112 or propeller blades 114 may be provided within the propeller hub 110.

Further, within the housing 210 of the propeller hub 110, the pitch adjustment shaft 122 may couple to a pitch adjustment gear 215 that is in operative engagement with each of the blade gears 217. The pitch adjustment gear 215 may be a bevel gear, e.g., a straight bevel gear or a spiral bevel gear. In addition, the pitch adjustment shaft 122 and/or the pitch adjustment gear 215 may include one or more bearings or other similar, friction-reducing elements to facilitate rotation of the pitch adjustment gear 215 relative to the housing 210.

When the pitch adjustment shaft 122 is rotated via an input to a component of the compound gearbox, as further described herein with respect to FIGS. 3-5, the pitch adjustment gear 215 may rotate together with the pitch adjustment shaft 122. Rotation of the pitch adjustment gear 215 may cause rotation of the blade gears 217 that are in operative engagement with the pitch adjustment gear 215, and rotation of the blade gears 217 may cause corresponding rotation of the propeller blade shafts 112 and propeller blades 114. Therefore, rotation of the pitch adjustment shaft 122 may cause rotation, i.e., changes in pitch, of each of the propeller blades 114 that extend from the propeller hub 110.

For example, the operative engagement between the pitch adjustment gear 215 and the blade gears 217 may ensure that each of the blade gears 217 rotates in a same rotational direction in response to rotation of the pitch adjustment gear 215. Further, if all the blade gears 217 have the same size and the same number of gear teeth, each of the blade gears 217 may rotate a same degree of rotation, i.e., a same change in pitch of the propeller blades 114, in response to rotation of the pitch adjustment gear 215.

Furthermore, the housing 210 of the propeller hub 110 may be a substantially closed system, such that lubricant may be maintained within the propeller hub 110 to facilitate smooth engagement between the pitch adjustment gear 215 and the blade gears 217 and smooth rotation of the pitch adjustment shaft 122 and the propeller blade shafts 112, as well as to prevent contamination and deterioration of the components and/or lubricant.

FIG. 3 is a schematic diagram of a first stage gearbox of the compound gearbox 120 of the first propeller blade pitch adjustment apparatus 300, according to an implementation. The apparatus 300 shown in FIG. 3 is substantially the same as the apparatuses 100, 200 shown in FIGS. 1 and 2, but with some elements removed and/or shown in outline for clarity of description. The apparatus 300 may include a compound gearbox 120 that is arranged at one end of a motor shaft 108. The motor shaft 108 may be rotated by a rotor of a motor and may be a hollow motor shaft.

As described herein, a first end of the motor shaft 108 may be coupled to a propeller hub 110, as further described with respect to FIG. 2. The propeller hub 110 may rotate with the motor shaft 108, and the propeller hub 110 may include components that allow adjustment of the pitches of the propeller blades that extend from the propeller hub 110.

The first stage gearbox, or first planetary stage, of the compound gearbox 120 may include a first sun gear 315, a plurality of first planet gears 325 carried by a first planetary gear carrier 123, and a ring gear 330. A second end of the motor shaft 108 may be coupled to the first sun gear 315, such that the first sun gear 315 may rotate together with rotation of the motor shaft 108. The plurality of first planet gears 325 may be in operative engagement with the first sun gear 315. The plurality of first planet gears 325 may be carried on posts 323 or stems associated with the first planetary gear carrier 123. Although not shown in FIG. 3, the first planetary gear carrier 123 may be coupled to each of the posts 323. In addition, the first planetary gear carrier 123 may be rotationally fixed to the stator 106 of the motor 104, the motor arm 102, a frame or body portion of the aerial vehicle, or any other component that does not rotate relative to the stator 106 of the motor 104. Further, the ring gear 330 may be in operative engagement with each of the plurality of first planet gears 325. In addition, each of the motor shaft 108, the first sun gear 315, the first planet gears 325, and/or the ring gear 330 may include one or more bearings or other similar, friction-reducing elements to facilitate their rotation relative to the first planetary gear carrier 123 and/or the second planetary gear carrier 124. While FIG. 3 shows four first planet gears 325-1, 325-2, 325-3, 325-4 on four posts 323-1, 323-2, 323-3, 323-4, any other number and arrangement of first planet gears 325 and posts 323 may be provided within the first stage gearbox.

When the motor shaft 108 is rotated by the rotor of the motor, the first sun gear 315 may rotate together with the motor shaft 108. Rotation of the first sun gear 315 may cause rotation of each of the plurality of first planet gears 325 on the rotationally fixed first planetary gear carrier 123, and rotation of the plurality of first planet gears 325 may cause rotation of the ring gear 330. The ring gear 330 may rotate in an opposite rotational direction from the direction of rotation of the first sun gear 315, and the ring gear 330 may rotate at a different rotational speed from the speed of rotation of the first sun gear 315.

FIG. 4 is a schematic diagram of a second stage gearbox of the compound gearbox 120 of the first propeller blade pitch adjustment apparatus 400, according to an implementation. The apparatus 400 shown in FIG. 4 is substantially the same as the apparatuses 100, 200, 300 shown in FIGS. 1-3, but with some elements removed and/or shown in outline for clarity of description. The apparatus 400 may include a compound gearbox 120 that is arranged at one end of a motor shaft 108. The motor shaft 108 may be rotated by a rotor of a motor and may be a hollow motor shaft.

The second stage gearbox, or second planetary stage, of the compound gearbox 120 may include a second sun gear 415, a plurality of second planet gears 425 carried by a second planetary gear carrier 124, and the ring gear 330 that is shared between the first stage gearbox and the second stage gearbox. A second end of the pitch adjustment shaft 122 may extend through both the hollow motor shaft 108 and the first sun gear 315 and may be coupled to the second sun gear 415, such that the pitch adjustment shaft 122 rotates together with rotation of the second sun gear 415. The plurality of second planet gears 425 may be in operative engagement with the second sun gear 415. The plurality of second planet gears 425 may be carried on posts 423 or stems associated with the second planetary gear carrier 124. The second planetary gear carrier 124 may be coupled to each of the posts 423. In addition, the second planetary gear carrier 124 may be selectively rotatable relative to the stator 106 of the motor 104, the motor arm 102, a frame or body portion of the aerial vehicle, or any other component that is fixed relative to the stator 106 of the motor 104. Further, the ring gear 330 may be in operative engagement with each of the plurality of second planet gears 425. In addition, each of the pitch adjustment shaft 122, the second sun gear 415, the second planet gears 425, and/or the ring gear 330 may include one or more bearings or other similar, friction-reducing elements to facilitate their rotation relative to the first planetary gear carrier 123 and/or the second planetary gear carrier 124. While FIG. 4 shows four second planet gears 425-1, 425-2, 425-3, 425-4 on four posts 423-1, 423-2, 423-3, 423-4, any other number and arrangement of second planet gears 425 and posts 423 may be provided within the second stage gearbox.

When, as described herein, the ring gear 330 is rotated as a result of rotation of the motor shaft 108 by the rotor of the motor, the second planet gears 425 may rotate on the selectively rotatable second planetary gear carrier 124. Rotation of the second planet gears 425 may cause rotation of the second sun gear 415, and rotation of the second sun gear 415 may cause rotation of the pitch adjustment shaft 122. If the first sun gear 315 and the second sun gear 415 have the same size and the same number of gear teeth, if all the first planet gears 325 and the second planet gears 425 have the same size and the same number of gear teeth, and if the second planetary gear carrier 124 is held in position relative to the first planetary gear carrier 123, the motor shaft 108 and the pitch adjustment shaft 122 may rotate in the same rotational direction at the same rotational speed. As a result, during operation of the motor, the propeller blades may rotate to generate thrust based on the rotation of the motor shaft, while also maintaining a desired pitch of the propeller blades during operation.

In order to adjust pitches of the propeller blades, the second planetary gear carrier 124 may be selectively rotated relative to the first planetary gear carrier 123. For example, as shown in FIGS. 1-4, the second planetary gear carrier 124 may include gear teeth on an outer surface thereof, and an actuator (not shown) having corresponding gear teeth may be in operative engagement with the gear teeth of the second planetary gear carrier 124 to adjust the rotational position of the second planetary gear carrier 124. The actuator may be a servo actuator, a geared actuator, a rotary actuator, a rack and pinion actuator, a screw actuator, and/or any other type of actuator. Alternatively or in addition, any other method of actuating the second planetary gear carrier 124 may be used instead of the gear teeth on the outer surface thereof. For example, a portion of the second planetary gear carrier 124 may be directly connected to an actuator, e.g., a servo actuator, a motor, or any other type of actuator, to adjust the rotational position of the second planetary gear carrier 124. Other types of actuation mechanisms may also be used, such as pulley-type mechanisms to adjust the rotational position of the second planetary gear carrier 124.

As an illustration, if the motor shaft 108 is not rotated by the rotor of the motor, and the first stage gearbox and the second stage gearbox of the compound gearbox 120 are not being actuated by the motor, the motor shaft 108, the first sun gear 315, the first planet gears 325, the ring gear 330, the second planet gears 425, the second sun gear 415, and the pitch adjustment shaft 122 may be stationary. If the second planetary gear carrier 124 is then rotated relative to the first planetary gear carrier 123 to adjust the pitches of the propeller blades 112 via the propeller hub 110, the rotation of the second planetary gear carrier 124 may cause rotation of the second planet gears 425 such that the second planet gears 425 rotate within the ring gear 330. The ring gear 330 may be held stationary by the stationary motor shaft 108 and the first stage gearbox. The rotation of the second planet gears 425 within the ring gear 330 may cause the second sun gear 415 to rotate, and thereby may cause rotation of the pitch adjustment shaft 122. Then, as described herein, the rotation of the pitch adjustment shaft 122 may cause adjustment of the pitches of the propeller blades 112 via the propeller hub 110. While the adjustment of pitches of the propeller blades 112 is described herein in the context of a stationary motor shaft 108 for ease of illustration, the second planetary gear carrier 124 may also be rotated relative to the first planetary gear carrier 123 during rotation of the motor shaft 108, e.g., during operation of the motor, to adjust the pitches of the propeller blades 112.

Furthermore, the compound gearbox 120 may be a substantially closed system, such that lubricant may be maintained within the compound gearbox 120 to facilitate smooth engagement between the first sun gear 315, the first planet gears 325, the ring gear 330, the second planet gears 425, and the second sun gear 415 and smooth rotation of the motor shaft 108 and the pitch adjustment shaft 122, as well as to prevent contamination and deterioration of the components and/or lubricant.

FIG. 5 is a schematic diagram of the compound gearbox 120 of the first propeller blade pitch adjustment apparatus 500, according to an implementation. The apparatus 500 shown in FIG. 5 is substantially the same as the apparatuses 100, 200, 300, 400 shown in FIGS. 1-4, but with some elements removed and/or shown in outline for clarity of description. The apparatus 500 may include a compound gearbox 120 that is arranged at one end of a motor shaft 108. The motor shaft 108 may be rotated by a rotor of a motor and may be a hollow motor shaft.

FIG. 5 shows an underside view of the compound gearbox 120 with the first planetary gear carrier 123 and the second planetary gear carrier 124 removed for clarity. Thus, FIG. 5 shows the motor shaft 108, the first sun gear 315, the first planet gears 325, the ring gear 330, the second planet gears 425, the second sun gear 415, and the pitch adjustment shaft 122, as described herein with respect to FIGS. 1-4. Further, while FIGS. 3-5 show the first stage gearbox and the second stage gearbox having the same number of planet gears, e.g., four first planet gears and four second planet gears, any other number and arrangement of first or second planet gears 325, 425 may be provided within the first or second stage gearboxes, e.g., four first planet gears and three second planet gears.

Each of the components of the propeller hub 110 and the compound gearbox 120 may be made from any suitable materials, such as metal, plastics, carbon fiber, other materials, or combinations thereof, for example. In addition, the various gears may be coupled to the various shafts using any suitable connection methods, such as keyed connections, frictionally engaged connections, screw connections, set screws, adhesives, other connections, or combinations thereof. Alternatively or in addition, one or more of the various gears may be integrally formed with their respective shafts. Further, while FIGS. 1 and 2 show the propeller hub 110 having a substantially rectangular prism shape, any other shape or configuration of the propeller hub 110 is possible, e.g., circular prism, elliptical prism, hexagonal prism, octagonal prism, or other polygonal prism.

The first propeller blade pitch adjustment apparatuses 100, 200, 300, 400, 500, including the propeller hub 110 and the compound gearbox 120, as described herein with respect to FIGS. 1-5, may allow a variation in pitches of propeller blades of at least more than 90 degrees, and may allow potentially infinite variation in pitches of propeller blades. Accordingly, thrust reversal of a propeller and corresponding motor may be accomplished without any reduction in propulsive efficiency using the first propeller blade pitch adjustment apparatuses to adjust the pitches of propeller blades by approximately 180 degrees and reversing a rotation of the motor. Moreover, various other changes to the thrust profile of a propeller and corresponding motor may be accomplished using the first propeller blade pitch adjustment apparatuses to adjust the pitches of propeller blades as desired.

In an alternative embodiment to FIGS. 1-5, the compound gearbox 120 may be situated between the motor 104 and the propeller hub 110, with the first stage gearbox of the compound gearbox 120 adjacent the motor 104 and the second stage gearbox of the compound gearbox 120 adjacent the propeller hub 110. Accordingly, the first planetary gear carrier may be rotationally fixed relative to and situated adjacent a stator of the motor 104, and the second planetary gear carrier may be selectively rotatable and situated adjacent the propeller hub 110.

In this alternative embodiment, the pitch adjustment shaft 122 may instead be a hollow pitch adjustment shaft, and the motor shaft 108 may extend within and through the hollow pitch adjustment shaft. The motor shaft may be coupled to and extend through the first sun gear 315 of the first stage gearbox, then extend through the compound gearbox 120 within the hollow pitch adjustment shaft and couple to a portion of the propeller hub 110, e.g., a portion of the propeller hub 110 distal from the motor 104. The hollow pitch adjustment shaft may be coupled to the second sun gear 415 at a first end and coupled to a pitch adjustment gear within the propeller hub 110 at a second end.

The propeller hub 110 in this alternative embodiment may be substantially similar to that described herein with respect to FIGS. 1 and 2, except that the pitch adjustment shaft may be hollow, and the motor shaft may extend through the hollow pitch adjustment shaft and the pitch adjustment gear and couple to a portion of the propeller hub 110, e.g., a portion of the propeller hub 110 distal from the motor 104, in order to rotate the propeller hub 110 together with rotation of the motor shaft.

The compound gearbox 120 in this alternative embodiment may also be substantially similar to that described herein with respect to FIGS. 2-5, except that the pitch adjustment shaft may be hollow, and the motor shaft may couple to and extend through the first sun gear 315 and then extend through the hollow pitch adjustment shaft and the second sun gear 415 en route to the propeller hub 110, as described herein.

Figure 6A:
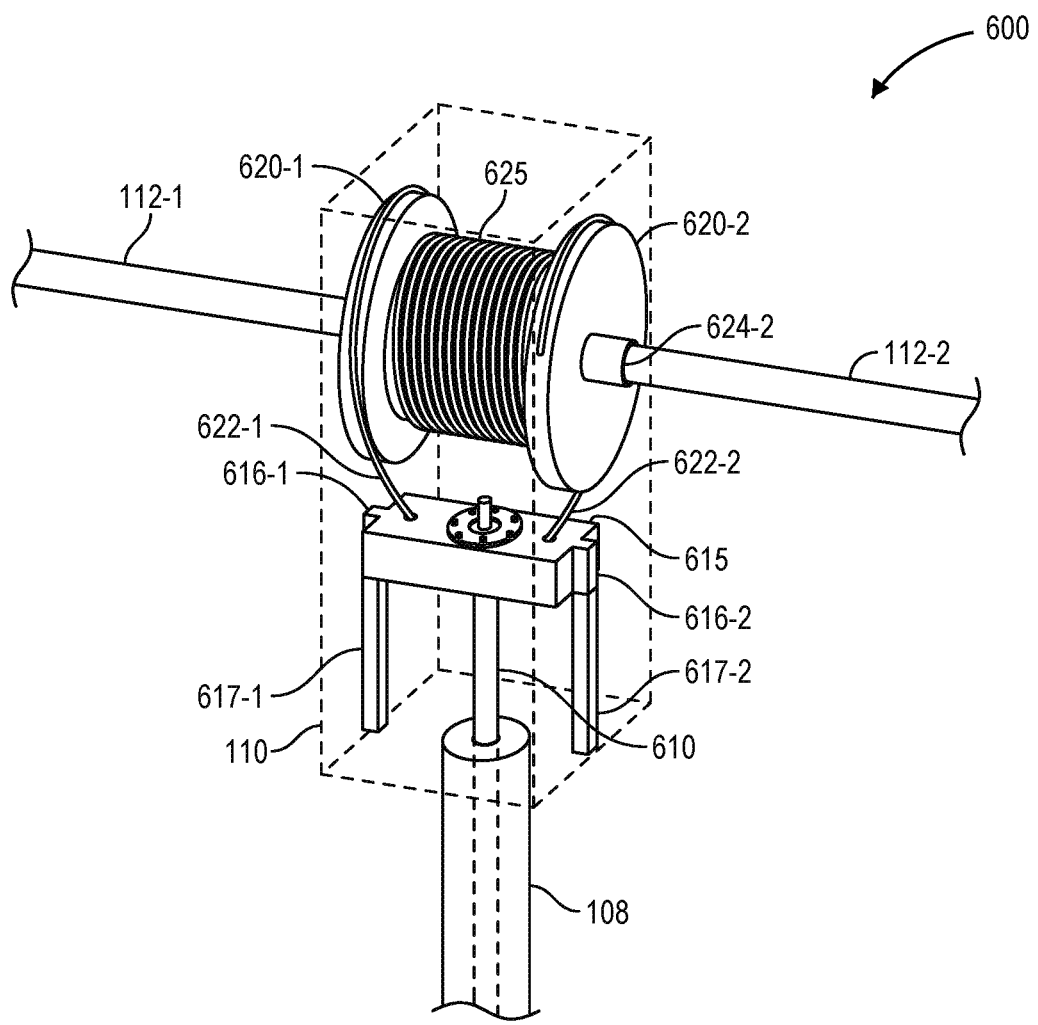
FIG. 6A is a schematic diagram of a second propeller blade pitch adjustment apparatus, according to an implementation.
Figure 6B:
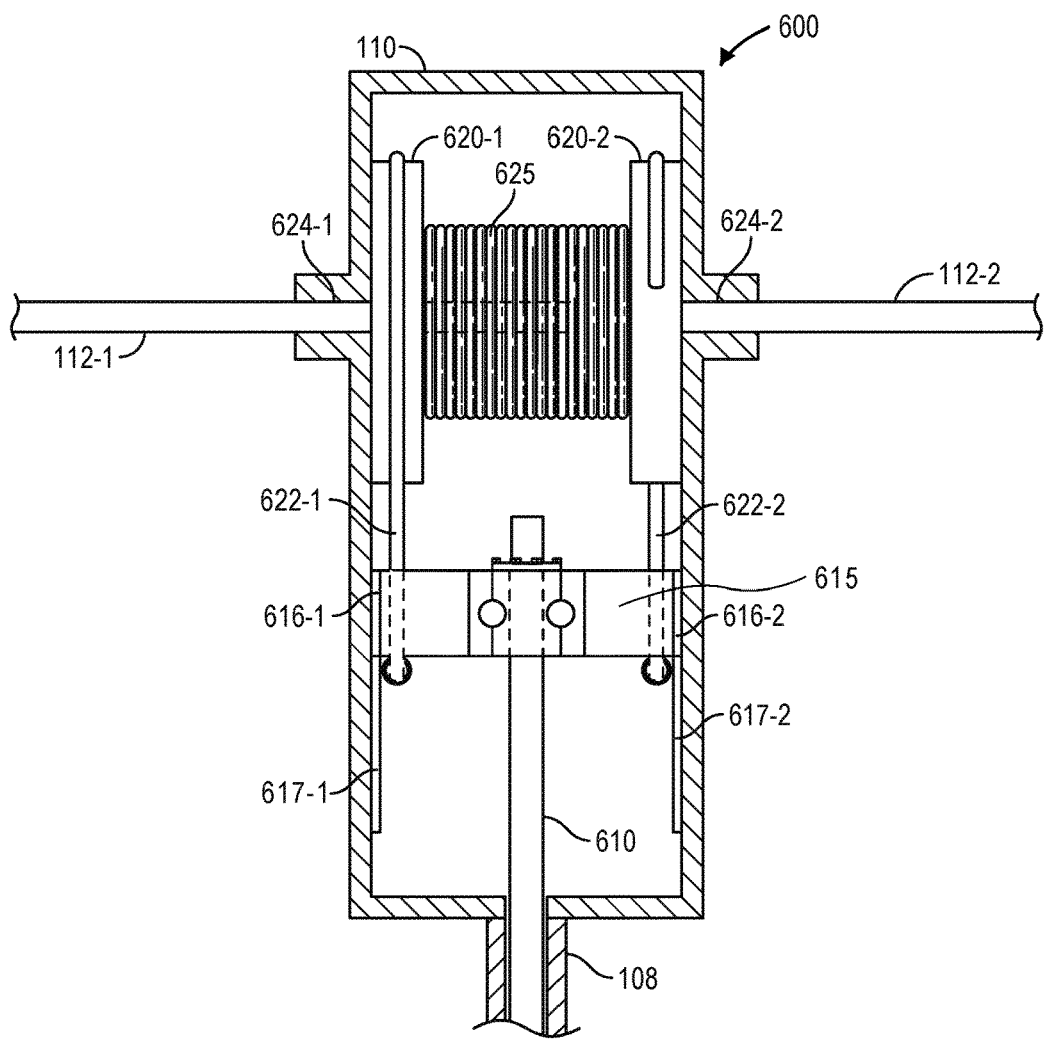
FIG. 6B is a schematic, partial cross-section diagram of the second propeller blade pitch adjustment apparatus, according to an implementation.

FIG. 6A is a schematic diagram of a second propeller blade pitch adjustment apparatus 600, and FIG. 6B is a schematic, partial cross-section diagram of the second propeller blade pitch adjustment apparatus 600, according to an implementation. The apparatus 600 may include a propeller hub 110 coupled to a motor shaft 108 that is rotated by a rotor of a motor. The motor shaft 108 may be a hollow motor shaft that extends from the motor. In addition, a control shaft 610 may extend within the hollow motor shaft 108 between components within the propeller hub 110 and a side of the motor opposite the propeller hub 110.

The propeller hub 110 may be coupled to and rotate together with rotation of the motor shaft 108. In addition, the propeller hub 110 may be formed integrally with the motor shaft 108. The propeller hub 110 may also include one or more openings 624 through which propeller blade shafts 112 or propeller blades may extend from the propeller hub 110.

The openings 624 may be circular, cylindrical, or otherwise shaped to allow changes in pitches of the propeller blades connected to the propeller blade shafts 112. In addition, the openings 624 may include bearings or other similar, friction-reducing elements to facilitate rotation of the propeller blade shafts 112 or propeller blades. While FIGS. 6A and 6B show two openings 624-1, 624-2 and two propeller blade shafts 112-1, 112-2 or propeller blades, any other number and arrangement of openings 624 and propeller blade shafts 112 and propeller blades may be provided that extend from the propeller hub 110.

A propeller blade pitch adjustment assembly may be situated within the propeller hub 110. The propeller blade pitch adjustment assembly may include a control shaft 610, a control member 615, one or more pitch adjustment spools 620 coupled to the propeller blade shafts 112 or propeller blades, one or more tension cables 622, and one or more torsion springs 625. The control shaft 610 may extend within and through the hollow motor shaft 108 and be rotatably coupled to the control member 615. For example, the control shaft 610 may include bearings or other similar, friction-reducing elements to facilitate rotation of the control shaft 610 relative to the control member 615. On a side of the motor opposite the propeller hub 110, the control shaft 610 may extend past the motor and be actuated by an actuator, e.g., a servo actuator, a geared actuator, a motor, a rotary actuator, a rack and pinion actuator, a screw actuator, a linear actuator, and/or any other type of actuator.

Alternatively, the control shaft 610 may be coupled directly to the control member 615 and rotate together with the control member 615, propeller hub 110, and motor shaft 108. On a side of the motor opposite the propeller hub 110, the end of the control shaft 610 may extend past the motor and be rotatably coupled to an actuator. For example, the end of the control shaft 610 may include bearings or other similar, friction-reducing elements to facilitate rotation of the control shaft 610 relative to a connection to the actuator, such that the actuator need not rotate together with the control shaft 610 and motor shaft 108.

The control member 615 may comprise a plate, block, or other structure that may move within the propeller hub 110. For example, the control member 615 may be pushed or pulled by the control shaft 610 in a direction parallel to an axial length of the control shaft 610. In addition, the direction of motion of the control member 615 may be substantially transverse to axes of rotation of the pitch adjustment spools 620, propeller blade shafts 112 and propeller blades. The control member 615 may include protrusions 616 that extend into grooves 617 of the propeller hub 110 to facilitate the movement of the control member 615 upon actuation by the control shaft 610. Alternatively or in addition, the control member 615 may include grooves into which protrusions of the propeller hub 110 extend to facilitate movement of the control member 615. Further, any other structures or formations along portions of the mating surfaces of the control member 615 and propeller hub 110 may be used to facilitate movement of the control member 615, such as guides, tracks, rods, linear bearings, other similar friction-reducing elements, or any other cooperating shapes or structures between the control member 615 and the propeller hub 110. In some embodiments, the control member 615 may be sized to substantially fill the cross-sectional shape of the propeller hub 110. While FIGS. 6A and 6B show two protrusions 616-1, 616-2 and two grooves 617-1, 617-2 on the control member 615 and propeller hub 110, respectively, any other number and arrangement of protrusions, grooves, or other structures or formations may be provided to facilitate movement of the control member 615 within the propeller hub 110.

Figure 6C:
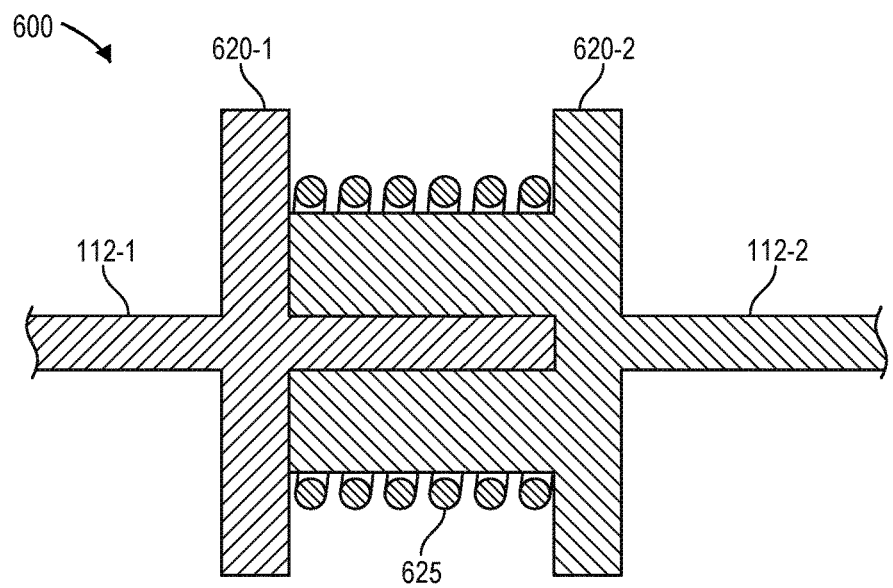
FIG. 6C is a schematic, partial cross-section diagram of pitch adjustment spools of the second propeller blade pitch adjustment apparatus, according to an implementation.

The pitch adjustment spools 620 may be coupled to the propeller blade shafts 112 and propeller blades, and the pitch adjustment spools 620 may be rotatably coupled to each other. FIG. 6C is a schematic, partial cross-section diagram of pitch adjustment spools 620 of the second propeller blade pitch adjustment apparatus 600, according to an implementation. For example, as shown in FIG. 6C, the pitch adjustment spools 620 may have portions that overlap with each other, such that the pitch adjustment spools 620 may rotate about a same axis of rotation. The interfaces between the pitch adjustment spools 620 may include bearings or other similar, friction-reducing elements to facilitate rotation of the pitch adjustment spools 620 relative to each other. In addition, the pitch adjustment spools 620 may be connected to each other via a torsion spring 625 that may bias the pitch adjustment spools 620 to particular rotational positions relative to each other. The torsion spring 625 may bias the pitch adjustment spools 620 in opposite rotational directions from each other. The torsion spring 625 may be attached to the pitch adjustment spools 620 using screws, rivets, clamps, any other types of fasteners, welds, adhesives, or any other attachment methods.

The pitch adjustment spools 620 may be coupled to the control member 615 via tension cables 622. For example, the tension cables 622 may be steel wires or any other connecting wire or cable. The tension cables 622 may be attached to portions of the pitch adjustment spools 620 at their first ends, and attached to portions of the control member 615 at their second ends. The tension cables 622 may be attached at their first and second ends using screws, rivets, clamps, any other types of fasteners, welds, adhesives, or any other attachment methods. The attachment points of the tension cables 622 to the pitch adjustment spools 620 may be configured such that movement of the control member 615, e.g., in response to pulling by the control shaft 610, may cause rotation of the pitch adjustment spools 620 in opposite rotational directions against the biasing force of the torsion spring 625. The tension cables 622 may also run along grooves or channels provided on surfaces of the pitch adjustment spools 620.

When the motor shaft 108 is rotated by the rotor of the motor, the propeller hub 110 may rotate together with the motor shaft 108. Rotation of the propeller hub 110 may cause rotation of the control member 615 via the mating surfaces or connections, e.g., protrusions 616 and grooves 617, between the control member 615 and the propeller hub 110. Rotation of the propeller hub 110 may also cause rotation of the pitch adjustment spools 620, propeller blade shafts 112 and propeller blades via the openings 624 through which the propeller blade shafts 112 or propeller blades extend from the propeller hub 110. As a result, the propeller hub 110, the control member 615, the pitch adjustment spools 620, the tension cables 622, the torsion spring 625, the propeller blade shafts 112 and the propeller blades may rotate together with the motor shaft 108. In contrast, the control shaft 610, via the rotatable connection to the control member 615 in one embodiment, may not necessarily rotate together with the propeller hub 110 and the remainder of the propeller blade pitch adjustment assembly. In an alternative embodiment in which the control shaft 610 is directly coupled to the control member 615, the control shaft 610 may rotate together with the propeller hub 110, the motor shaft 108, and the remainder of the propeller blade pitch adjustment assembly, and the control shaft 610 may include a rotatable connection to the actuator on an opposite side of the motor, such that the actuator need not rotate together with the control shaft 610, the motor shaft 108, the propeller hub 110, and the remainder of the propeller blade pitch adjustment assembly.

When adjustments to pitches of the propeller blades are desired, the control shaft 610 may be moved relative to the propeller hub 110, e.g., pulled in a direction away from and transverse to axes of rotation of the pitch adjustment spools 620, propeller blade shafts 112, and propeller blades. The movement of the control shaft 610 may also move the control member 615 away from and transverse to axes of rotation of the pitch adjustment spools 620, propeller blade shafts 112, and propeller blades. The movement of the control member 615 may pull the tension cables 622, thereby rotating the pitch adjustment spools 620 against the biasing force of the torsion spring 625. The pitch adjustment spools 620 may rotate in opposite rotational directions in response to pulling by the tension cables 622, such that the propeller blade shafts 112 and propeller blades may rotate to adjust the pitches of the propeller blades by substantially the same degree of rotation.

While FIGS. 6A and 6B show two pitch adjustment spools 620-1, 620-2, two tension cables 622-1, 622-2, and one torsion spring 625 that interconnects the two pitch adjustment spools 620-1, 620-2, any other number and arrangement of pitch adjustment spools 620, tension cables 622, and torsion springs 625 may be provided in the second propeller blade pitch adjustment apparatus 600. For example, if the second propeller blade pitch adjustment apparatus 600 includes three or more pitch adjustment spools 620, the pitch adjustment spools 620 may each be rotatably coupled to a central member, e.g., that is fixed relative to the propeller hub 110, via a respective torsion spring 625, and the pitch adjustment spools 620 may each be coupled to the control member 615 by a respective tension cable 622. In this manner, the pitches of three or more propeller blades may be substantially simultaneously adjusted using the second propeller blade pitch adjustment apparatus 600.

Furthermore, the propeller hub 110 may be a substantially closed system, such that lubricant may be maintained within the propeller hub 110 to facilitate smooth engagement between the control member 615 and the propeller hub 110, smooth operation of the control shaft 610 and the pitch adjustment spools 620, and smooth rotation of the propeller blade shafts 112 and propeller blades, as well as to prevent contamination and deterioration of the components and/or lubricant.

Each of the components of the second propeller blade pitch adjustment apparatus 600, including the motor shaft 108, propeller hub 110, control shaft 610, control member 615, pitch adjustment spools 620, tension cables 622, torsion spring 625, and/or propeller blade shafts 112 and propeller blades, may be made from any suitable materials, such as metal, plastics, carbon fiber, other materials, or combinations thereof, for example. In addition, the pitch adjustment spools may be coupled to the propeller blade shafts or propeller blades using any suitable connection methods, such as keyed connections, frictionally engaged connections, screw connections, set screws, adhesives, other connections, or combinations thereof. Alternatively or in addition, one or more of the pitch adjustment spools may be integrally formed with their respective propeller blade shafts or propeller blades. Further, while FIGS. 6A and 6B show the second propeller blade adjustment apparatus 600 having a substantially rectangular prism shape, any other shape or configuration of the apparatus 600 is possible, e.g., circular prism, elliptical prism, hexagonal prism, octagonal prism, or other polygonal prism.

The second propeller blade pitch adjustment apparatus 600, including the propeller hub 110 and propeller blade pitch adjustment assembly enclosed therein, as described herein with respect to FIGS. 6A-6C, may allow a variation in pitches of propeller blades of at least more than 90 degrees, and may allow a variation in pitches of propeller blades of up to 360 degrees or more, e.g., if the tension cables are wound around the pitch adjustment spools one or more times and with sufficient available travel of the control shaft and control member. Accordingly, thrust reversal of a propeller and corresponding motor may be accomplished without any reduction in propulsive efficiency using the second propeller blade pitch adjustment apparatus to adjust the pitches of propeller blades by approximately 180 degrees and reversing a rotation of the motor. Moreover, various other changes to the thrust profile of a propeller and corresponding motor may be accomplished using the second propeller blade pitch adjustment apparatus to adjust the pitches of propeller blades as desired.

Figure 7A:
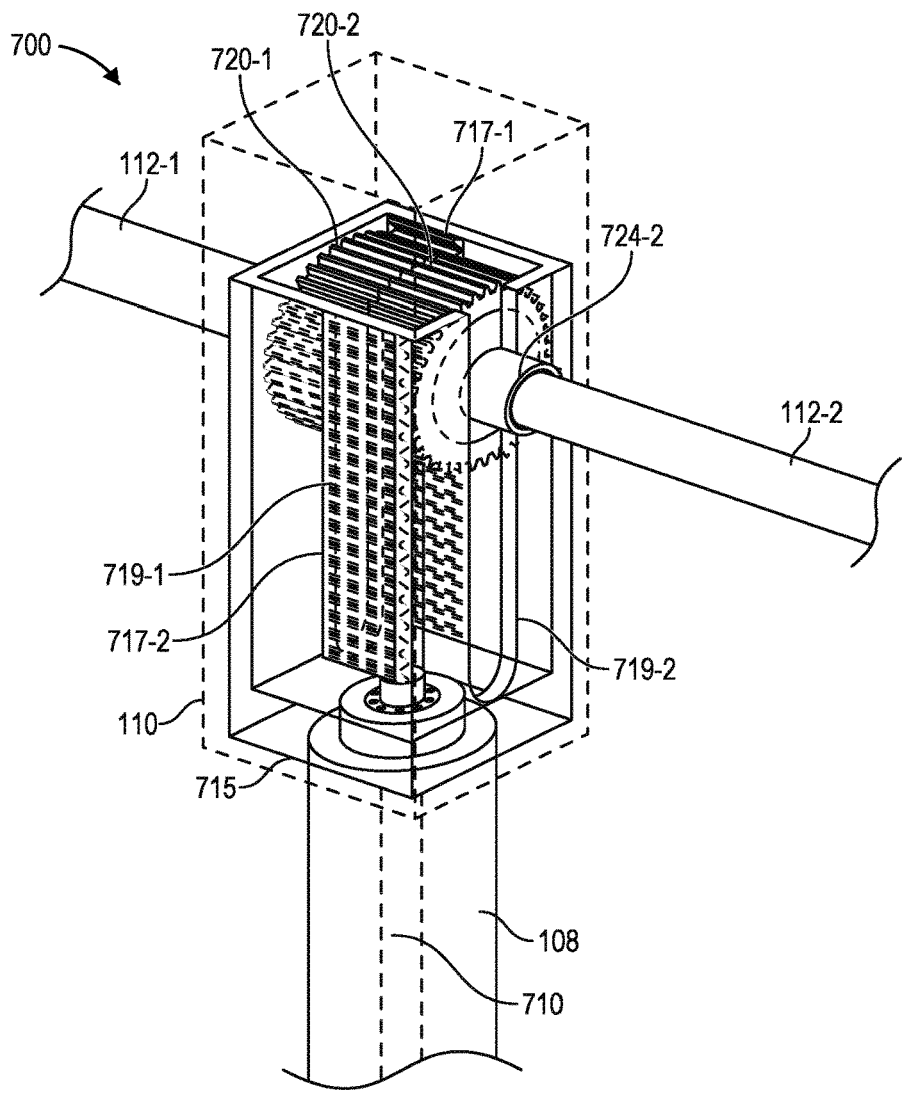
FIG. 7A is a schematic diagram of a third propeller blade pitch adjustment apparatus, according to an implementation.

FIG. 7A is a schematic diagram of a third propeller blade pitch adjustment apparatus 700, according to an implementation. The apparatus 700 may include a propeller hub 110 coupled to a motor shaft 108 that is rotated by a rotor of a motor. The motor shaft 108 may be a hollow motor shaft that extends from the motor. In addition, a control shaft 710 may extend within the hollow motor shaft 108 between components within the propeller hub 110 and a side of the motor opposite the propeller hub 110.

The propeller hub 110 may be coupled to and rotate together with rotation of the motor shaft 108. In addition, the propeller hub 110 may be formed integrally with the motor shaft 108. The propeller hub 110 may also include one or more openings 724 through which propeller blade shafts 112 or propeller blades may extend from the propeller hub 110. The openings 724 may be circular, cylindrical, or otherwise shaped to allow changes in pitches of the propeller blades connected to the propeller blade shafts 112. In addition, the openings 724 may include bearings or other similar, friction-reducing elements to facilitate rotation of the propeller blade shafts 112 or propeller blades. While FIG. 7A shows two openings 724-1 (hidden from view), 724-2 and two propeller blade shafts 112-1, 112-2 or propeller blades, any other number and arrangement of openings 724 and propeller blade shafts 112 and propeller blades may be provided that extend from the propeller hub 110.

A propeller blade pitch adjustment assembly may be situated within the propeller hub 110. The propeller blade pitch adjustment assembly may include a control shaft 710, a control member 715, and one or more pitch adjustment spools 720 coupled to the propeller blade shafts 112 or propeller blades. The control shaft 710 may extend within and through the hollow motor shaft 108 and be rotatably coupled to the control member 715. For example, the control shaft 710 may include bearings or other similar, friction-reducing elements to facilitate rotation of the control shaft 710 relative to the control member 715. On a side of the motor opposite the propeller hub 110, the control shaft 710 may extend past the motor and be actuated by an actuator, e.g., a servo actuator, a geared actuator, a motor, a rotary actuator, a rack and pinion actuator, a screw actuator, a linear actuator, and/or any other type of actuator.

Alternatively, the control shaft 710 may be coupled directly to the control member 715 and rotate together with the control member 715, propeller hub 110, and motor shaft 108. On a side of the motor opposite the propeller hub 110, the end of the control shaft 710 may extend past the motor and be rotatably coupled to an actuator. For example, the end of the control shaft 710 may include bearings or other similar, friction-reducing elements to facilitate rotation of the control shaft 710 relative to a connection to the actuator, such that the actuator need not rotate together with the control shaft 710 and motor shaft 108.

The control member 715 may comprise a plate, block or other structure that may move within the propeller hub 110. For example, the control member 715 may be pushed or pulled by the control shaft 710 in a direction parallel to an axial length of the control shaft 710. In addition, the direction of motion of the control member 715 may be substantially transverse to axes of rotation of the pitch adjustment spools 720, propeller blade shafts 112 and propeller blades. The control member 715 may include racks 717, e.g., including gear teeth, that are operatively engaged with gear teeth on the pitch adjustment spools 720. For example, each rack 717 may be configured to operatively engage with gear teeth of a respective pitch adjustment spool 720. The control member 715 may also include slots 719 that allow movement of the control member 715 without interfering with the propeller blade shafts 112 and propeller blades that extend from the propeller hub 110. In alternative embodiments, the slots 719 may comprise openings at portions of the control member 715 that allow movement of the control member 715 without interfering with the propeller blade shafts 112 and propeller blades. Similar to the apparatus 600 of FIGS. 6A-6C, the control member 715 may include protrusions and/or grooves that cooperate with grooves and/or protrusions of the propeller hub 110 to facilitate the movement of the control member 715 upon actuation by the control shaft 710. Further, any other structures or formations along portions of the mating surfaces of the control member 715 and propeller hub 110 may be used to facilitate movement of the control member 715, such as guides, tracks, rods, linear bearings, other similar friction-reducing elements, or any other cooperating shapes or structures between the control member 715 and the propeller hub 110. In some embodiments, the control member 715 may be sized to substantially fill the cross-sectional shape of the propeller hub 110.

Figure 7B:
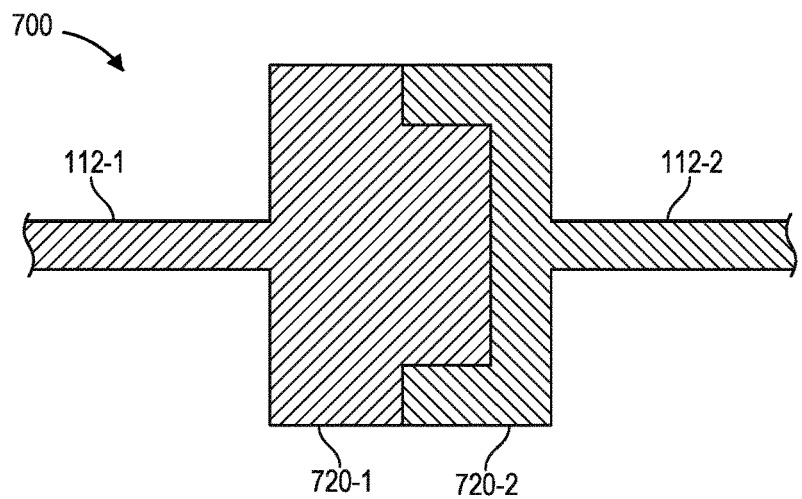
FIG. 7B is a schematic, partial cross-section diagram of pitch adjustment spools of the third propeller blade pitch adjustment apparatus, according to an implementation.

The pitch adjustment spools 720 may be coupled to the propeller blade shafts 112 and propeller blades, and the pitch adjustment spools 720 may be rotatably coupled to each other. FIG. 7B is a schematic, partial cross-section diagram of pitch adjustment spools 720 of the third propeller blade pitch adjustment apparatus 700, according to an implementation. For example, as shown in FIG. 7B, the pitch adjustment spools 720 may have portions that overlap with each other, such that the pitch adjustment spools 720 rotate about a same axis of rotation. The interfaces between the pitch adjustment spools 720 may include bearings or other similar, friction-reducing elements to facilitate rotation of the pitch adjustment spools 720 relative to each other.

The pitch adjustment spools 720 may also include gears, e.g., gear teeth on an outer surface of each of the pitch adjustment spools 720. The gear teeth of the pitch adjustment spools 720 may operatively engage with the gear teeth of respective racks 717 on the inner surfaces of the control member 715. As shown in FIG. 7A, each rack 717 of the control member 715 may be operatively engaged with gear teeth of a respective pitch adjustment spool 720 to cause rotation of the pitch adjustment spools 720 in opposite rotational directions, such that the pitches of propeller blades coupled to the pitch adjustment spools 720 via propeller blade shafts 112 are rotated by a same degree of rotation.

When the motor shaft 108 is rotated by the rotor of the motor, the propeller hub 110 may rotate together with the motor shaft 108. Rotation of the propeller hub 110 may cause rotation of the control member 715 via the mating surfaces or connections, e.g., protrusions and grooves, between the control member 715 and the propeller hub 110. Rotation of the propeller hub 110 may also cause rotation of the pitch adjustment spools 720, propeller blade shafts 112 and propeller blades via the openings 724 through which the propeller blade shafts 112 or propeller blades extend from the propeller hub 110. As a result, the propeller hub 110, the control member 715, the pitch adjustment spools 720, the propeller blade shafts 112 and the propeller blades may rotate together with the motor shaft 108. In contrast, the control shaft 710, via the rotatable connection to the control member 715 in one embodiment, may not necessarily rotate together with the propeller hub 110 and the remainder of the propeller blade pitch adjustment assembly. In an alternative embodiment in which the control shaft 710 is directly coupled to the control member 715, the control shaft 710 may rotate together with the propeller hub 110, the motor shaft 108, and the remainder of the propeller blade pitch adjustment assembly, and the control shaft 710 may include a rotatable connection to the actuator on an opposite side of the motor, such that the actuator need not rotate together with the control shaft 710, the motor shaft 108, the propeller hub 110, and the remainder of the propeller blade pitch adjustment assembly.

When adjustments to pitches of the propeller blades are desired, the control shaft 710 may be moved relative to the propeller hub 110, e.g., pushed in a direction toward or pulled in a direction away from and transverse to axes of rotation of the pitch adjustment spools 720 and propeller blade shafts 112 and propeller blades. The movement of the control shaft 710 may also move the control member 715 in a corresponding direction toward or away from and transverse to axes of rotation of the pitch adjustment spools 720 and propeller blade shafts 112 and propeller blades. The movement of the control member 715 may cause the pitch adjustment spools 720 to rotate due to the operative engagement between the gear teeth on the pitch adjustment spools 720 and the gear teeth on the racks 717 of the control member 715. The pitch adjustment spools 720 may rotate in opposite rotational directions in response to pushing or pulling by the control member 715, such that the propeller blade shafts 112 and propeller blades may rotate to adjust the pitches of the propeller blades by substantially the same degree of rotation.

While FIG. 7A shows two pitch adjustment spools 720-1, 720-2, two racks 717-1, 717-2, and two slots 719-1, 719-2, any other number and arrangement of pitch adjustment spools 720, racks 717, and slots 719 may be provided in the third propeller blade pitch adjustment apparatus 700. For example, if the third propeller blade pitch adjustment apparatus 700 includes three or more pitch adjustment spools 720, the pitch adjustment spools 720 may each be rotatably coupled to a central member, e.g., that is fixed relative to the propeller hub 110, and gear teeth of each of the pitch adjustment spools 720 may be coupled to a respective rack 717 of the control member 715. In this manner, the pitches of three or more propeller blades that extend from the propeller hub 110 via respective slots 719 may be substantially simultaneously adjusted using the third propeller blade pitch adjustment apparatus 700.

Furthermore, the propeller hub 110 may be a substantially closed system, such that lubricant may be maintained within the propeller hub 110 to facilitate smooth engagement between the control member 715 and the propeller hub 110, smooth engagement between the gear teeth of the control member 715 and the gear teeth of the pitch adjustment spools 720, smooth operation of the control shaft 710 and the pitch adjustment spools 720, and smooth rotation of the propeller blade shafts 112 and propeller blades, as well as to prevent contamination and deterioration of the components and/or lubricant.

Each of the components of the third propeller blade pitch adjustment apparatus 700, including the motor shaft 108, propeller hub 110, control shaft 710, control member 715, racks 717, pitch adjustment spools 720, and/or propeller blade shafts 112 and propeller blades, may be made from any suitable materials, such as metal, plastics, carbon fiber, other materials, or combinations thereof, for example. In addition, the pitch adjustment spools may be coupled to the propeller blade shafts using any suitable connection methods, such as keyed connections, frictionally engaged connections, screw connections, set screws, adhesives, other connections, or combinations thereof. Alternatively or in addition, one or more of the pitch adjustment spools may be integrally formed with their respective propeller blade shafts. Further, while FIG. 7A shows the third propeller blade adjustment apparatus 700 having a substantially rectangular prism shape, any other shape or configuration of the apparatus 700 is possible, e.g., circular prism, elliptical prism, hexagonal prism, octagonal prism, or other polygonal prism.

The third propeller blade pitch adjustment apparatus 700, including the propeller hub 110 and propeller blade pitch adjustment assembly enclosed therein, as described herein with respect to FIGS. 7A-7B, may allow a variation in pitches of propeller blades of at least more than 90 degrees, and may allow a variation in pitches of propeller blades of up to 360 degrees or more, e.g., with sufficient available travel of the control shaft and control member. Accordingly, thrust reversal of a propeller and corresponding motor may be accomplished without any reduction in propulsive efficiency using the third propeller blade pitch adjustment apparatus to adjust the pitches of propeller blades by approximately 180 degrees and reversing a rotation of the motor. Moreover, various other changes to the thrust profile of a propeller and corresponding motor may be accomplished using the third propeller blade pitch adjustment apparatus to adjust the pitches of propeller blades as desired.

Figure 8:
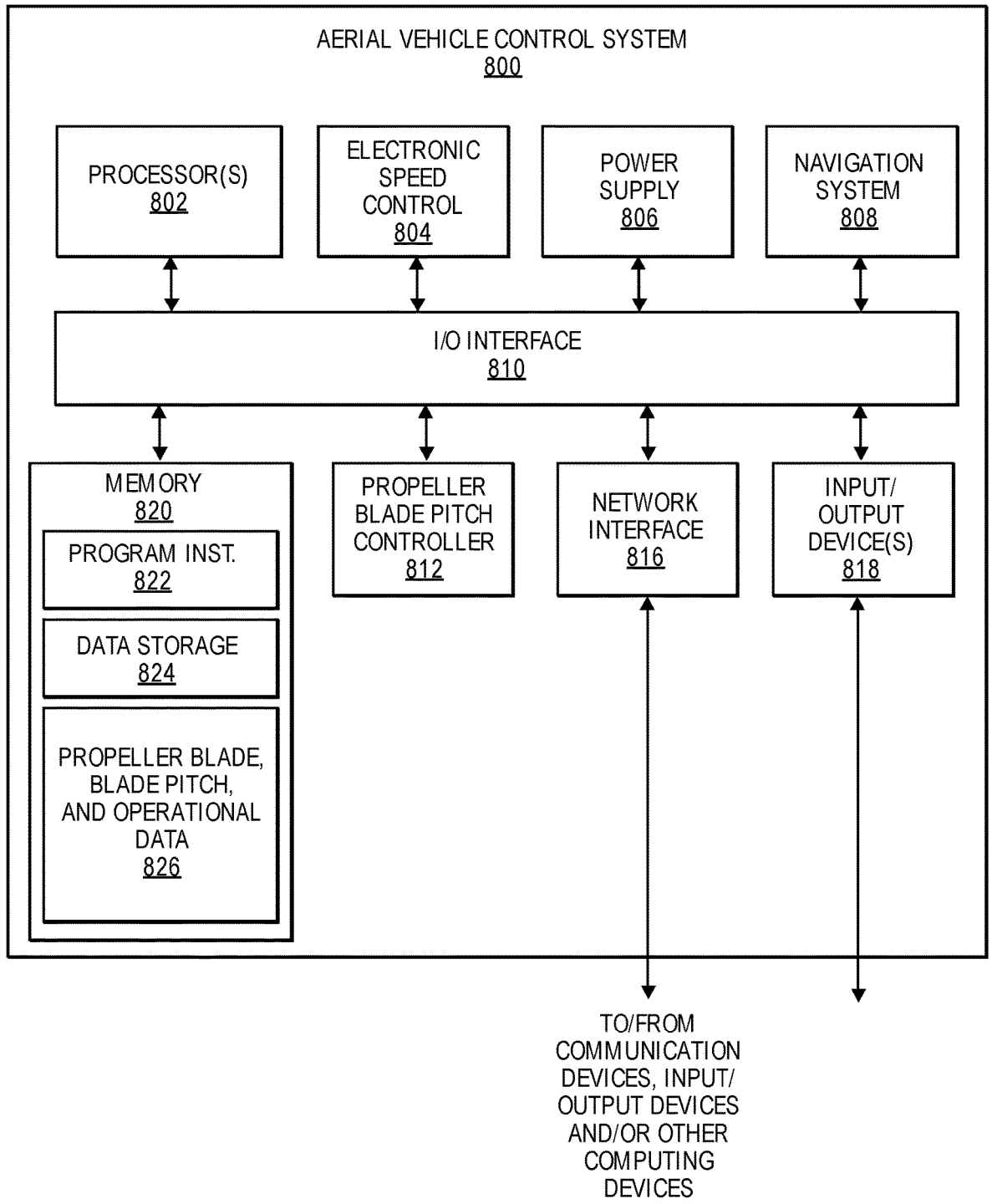
FIG. 8 is a block diagram illustrating various components of an aerial vehicle control system, according to an implementation.

FIG. 8 is a block diagram illustrating various components of an example aerial vehicle control system 800 of an example aerial vehicle which may utilize one or more of the propeller blade pitch adjustment apparatuses described herein, according to an implementation. In various examples, the block diagram may be illustrative of one or more aspects of the aerial vehicle control system 800 that may be used to implement the various systems and processes discussed above. In the illustrated implementation, the aerial vehicle control system 800 includes one or more processors 802, coupled to a non-transitory computer readable storage medium 820 via an input/output (I/O) interface 810. The aerial vehicle control system 800 may also include an electronic speed control or propulsion controller 804, a power controller/supply module 806 and/or a navigation system 808. The aerial vehicle control system 800 further includes a propeller blade pitch controller 812, a network interface 816, and one or more input/output devices 818.

In various implementations, the aerial vehicle control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, propeller blade data or characteristics, blade pitch data or characteristics, propeller blade pitch adjustment apparatus data or characteristics, data or characteristics associated with the aerial vehicle or any other system or machine utilizing the propeller blade pitch adjustment apparatuses, and/or other data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and propeller blade, blade pitch, and operational data 826, respectively. In other implementations, program instructions, data and/or operational data may be received, sent or stored upon different types of computer-accessible media, such as non-transitory media, or on similar media separate from the non-transitory computer readable storage medium 820 or the aerial vehicle control system 800. Propeller blade pitch adjustment apparatus data or characteristics may include data related to motor shafts 108, pitch adjustment shafts 122, blade gears 217, pitch adjustment gears 215, first sun gears 315, first planet gears 325, first planetary gear carriers 123, ring gears 330, second planet gears 425, second planetary gear carriers 124, second sun gears 415, control shafts 610, 710, control members 615, 715, pitch adjustment spools 620, 720, tension cables 622, torsion springs 625, racks 717, and/or any other components of the apparatuses 100-700 described herein.

Generally speaking, a non-transitory, computer readable storage medium may include storage media or memory media such as magnetic or optical media, e.g., disk or CD/DVD-ROM, coupled to the aerial vehicle control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 816 or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The electronic speed control or propulsion controller 804 communicates with the navigation system 808 and adjusts the operational characteristics of each propulsion mechanism to guide the aerial vehicle along a determined flight path and/or to perform other navigational maneuvers. The navigation system 808 may include a GPS or other similar system than can be used to navigate the aerial vehicle to and/or from a location.

The aerial vehicle control system 800 may also include a propeller blade pitch controller 812. The propeller blade pitch controller 812 communicates with components of the aerial vehicle, as discussed above, and controls the actuation of the second planetary gear carrier 124 and pitch adjustment shaft 122, control shaft 610, and/or control shaft 710 to adjust pitches of propeller blades. For example, an aerial vehicle control system 800 may operate a motor in a first rotational direction to generate thrust with a corresponding propeller, and if a thrust reversal is desired, the propeller blade pitch controller 812 may actuate the second planetary gear carrier 124 and pitch adjustment shaft 122, control shaft 610, and/or control shaft 710 to adjust pitches of the one or more propeller blades, e.g., rotate the blades by approximately 180 degrees, and the aerial vehicle control system 800 may operate the motor in a second rotational direction opposite from the first rotational direction.

The network interface 816 may be configured to allow data to be exchanged between the aerial vehicle control system 800, other devices attached to a network, such as other computer systems, aerial vehicle control systems of other aerial vehicles, and/or an aerial vehicle management system. For example, the network interface 816 may enable wireless communication between numerous aerial vehicles. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, image capture devices, imaging sensors, thermal sensors, infrared sensors, time of flight sensors, accelerometers, pressure sensors, weather sensors, etc. Multiple input/output devices 818 may be present and controlled by the aerial vehicle control system 800. One or more of these sensors may be utilized to determine an aerial vehicle operation, a flight condition, a location, and/or a time at which a change of pitch is desired for one or more propellers of the aerial vehicle.

As shown in FIG. 8, the memory may include program instructions 820 which may be configured to implement the example processes and/or sub-processes described above. The data storage 824 and propeller blade, blade pitch, and operational data 826 may include various data stores for maintaining data items that may be provided for controlling the actuation of the various propeller blade pitch adjustment apparatuses described herein to adjust pitches of propeller blades.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the aerial vehicle control system 800 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The aerial vehicle control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the aerial vehicle control system 800 may be transmitted to the aerial vehicle control system 800 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other aerial vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure.

It is intended to embrace all such modifications and changes and, accordingly, the above description is to be regarded in an illustrative rather than a restrictive sense.

What is claimed is:

1. A propeller blade pitch adjustment apparatus, comprising:
   a hollow motor shaft coupled to a propeller hub; and
   a propeller blade pitch adjustment assembly situated within and rotated by the propeller hub, the propeller blade pitch adjustment assembly comprising:
      a plurality of pitch adjustment spools, each of the plurality of pitch adjustment spools coupled to a respective propeller blade that extends outside the propeller hub;
      a control member operatively engaged with each of the plurality of pitch adjustment spools via respective tension cables, respective first ends of the respective tension cables coupled to respective ones of the plurality of pitch adjustment spools, and respective second ends of the respective tension cables coupled to the control member; and
      a control shaft coupled to the control member, the control shaft extending through the hollow motor shaft; and
   wherein actuation of the control shaft moves the control member and rotates the plurality of pitch adjustment spools to adjust respective pitches of the plurality of propeller blades.

2. The propeller blade pitch adjustment apparatus of claim 1, wherein the hollow motor shaft is coupled to and rotated by a rotor of a motor.

3. The propeller blade pitch adjustment apparatus of claim 1, wherein the control member and the plurality of pitch adjustment spools are rotated by the propeller hub, and the control shaft includes a rotational degree of freedom relative to the propeller hub.

4. The propeller blade pitch adjustment apparatus of claim 1, wherein the control shaft is actuated in a direction transverse to axes of rotation of the plurality of pitch adjustment spools.

5. An apparatus, comprising:
   a hollow motor shaft coupled to a propeller hub; and
   a propeller blade pitch adjustment assembly situated within the propeller hub, the propeller blade pitch adjustment assembly comprising:
      a pitch adjustment spool coupled to a propeller blade;
      a control member operatively engaged with the pitch adjustment spool via a tension cable, a first end of the tension cable coupled to the pitch adjustment spool, and a second end of the tension cable coupled to the control member; and
      a control shaft coupled to the control member, the control shaft extending through the hollow motor shaft.

6. The apparatus of claim 5, wherein the pitch adjustment spool includes a torsion spring.

7. The apparatus of claim 6, wherein the propeller blade pitch adjustment assembly includes at least two pitch adjustment spools rotatably connected to each other via the torsion spring, and each of the at least two pitch adjustment spools is connected to the control member via a respective tension cable.

8. The apparatus of claim 5, wherein the control member includes at least one of grooves or protrusions that cooperate with corresponding protrusions or grooves of the propeller hub.

9. The apparatus of claim 5, wherein the control shaft is rotatably coupled to the control member via a bearing.

10. The apparatus of claim 5, wherein the control member is shaped to correspond to at least a portion of an inner surface of the propeller hub.

11. The apparatus of claim 5, wherein the control shaft and the control member include at least one degree of freedom of translational motion in a direction transverse to an axis of rotation of the pitch adjustment spool.

12. The apparatus of claim 11, further comprising:
an actuator configured to actuate the control shaft and the control member in the at least one degree of freedom of translational motion, wherein the actuator comprises at least one of a servo actuator, a linear actuator, a rack and pinion actuator, or a screw actuator.

13. The apparatus of claim 12, wherein the control shaft is rotatably coupled to the actuator via a bearing.

14. A method of adjusting a pitch of a propeller blade, comprising:
actuating a control shaft to adjust a position of a control member, the control member being operatively engaged with a pitch adjustment spool via a tension cable within a propeller hub, a first end of the tension cable coupled to the pitch adjustment spool, a second end of the tension cable coupled to the control member, and the pitch adjustment spool being coupled to a propeller blade to adjust a pitch of the propeller blade;
wherein the control member, the pitch adjustment spool, and the propeller blade rotate with the propeller hub, and the control shaft is connected to the control member.

15. The method of claim 14, wherein the control shaft is actuated in a direction transverse to an axis of rotation of the pitch adjustment spool.

16. The method of claim 14, wherein the control shaft is actuated by at least one of a servo actuator, a linear actuator, a rack and pinion actuator, or a screw actuator.

17. The method of claim 14, further comprising:
causing rotation of the propeller hub via a motor shaft connected to a rotor of a motor; and
maintaining a rotational position of the control shaft relative to a stator of the motor via a rotatable coupling between the control shaft and the control member.

18. The method of claim 14, wherein the control member is operatively engaged with two pitch adjustment spools coupled to respective propeller blades that rotate around a same axis of rotation, each of the two pitch adjustment spools configured to rotate in opposite rotational directions responsive to actuation of the control shaft to adjust respective pitches of the respective propeller blades.

* * * * *